United States Patent
Snider et al.

(10) Patent No.: US 10,341,362 B2
(45) Date of Patent: Jul. 2, 2019

(54) APPARATUS AND METHOD FOR DETECTING A CLONED BASE STATION

(71) Applicant: Continental Automotive Systems, Inc., Auburn Hills, MI (US)

(72) Inventors: James Snider, Kildeer, IL (US); Robert F. D'Avello, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/022,570

(22) Filed: Jun. 28, 2018

(65) Prior Publication Data
US 2018/0309769 A1  Oct. 25, 2018

Related U.S. Application Data (62) Division of application No. 12/643,081, filed on Dec. 21, 2009, now Pat. No. 10,027,682.

(51) Int. Cl.
| | |
|---|---|
| *H04M 3/16* | (2006.01) |
| *H04B 7/00* | (2006.01) |
| *G06F 12/16* | (2006.01) |
| *G06F 17/30* | (2006.01) |
| *H04L 29/06* | (2006.01) |
| *B60R 25/102* | (2013.01) |
| *H04W 12/10* | (2009.01) |
| *H04W 36/00* | (2009.01) |
| *H04W 88/08* | (2009.01) |

(52) U.S. Cl.
CPC ........ *H04L 63/126* (2013.01); *B60R 25/1025* (2013.01); *H04W 12/10* (2013.01); *H04W 36/0061* (2013.01); *H04W 88/08* (2013.01)

(58) Field of Classification Search
CPC ..... H04W 12/08; H04W 12/12; H04W 8/005; H04L 63/08
See application file for complete search history.

(56) References Cited

U.S. PATENT DOCUMENTS

| | | | |
|---|---|---|---|
| 5,895,436 A | 4/1999 | Savoie et al. | |
| 6,330,438 B1 | 12/2001 | McClelland et al. | |
| 6,803,861 B2 | 10/2004 | Flick | |
| 2002/0014978 A1 | 2/2002 | Flick | |
| 2002/0163906 A1 | 11/2002 | Diachina et al. | |

(Continued)

FOREIGN PATENT DOCUMENTS

| | | |
|---|---|---|
| CN | 1972520 A | 5/2007 |
| DE | 10009488 A1 | 11/2000 |

(Continued)

OTHER PUBLICATIONS

International Search Report and Written Opinion dated Jun. 17, 2011, from corresponding International Patent Application No. PCT/US2010/060787.

(Continued)

*Primary Examiner* — Joshua L Schwartz (57) ABSTRACT

Communications are established between a base station and a mobile unit. The mobile unit analyzes the content of at least some information received from the base station relating to neighboring cells. When the analyzing indicates that the base station is a cloned base station, a warning is initiated to the user.

4 Claims, 4 Drawing Sheets

(56) References Cited

U.S. PATENT DOCUMENTS

| | | |
|---|---|---|
| 2003/0222813 A1 | 12/2003 | Boulay et al. |
| 2004/0005858 A1 | 1/2004 | Cervinka et al. |
| 2004/0075539 A1 | 4/2004 | Savoie et al. |
| 2005/0090952 A1 | 4/2005 | Boulay et al. |
| 2006/0007039 A1 | 1/2006 | Duvall |
| 2006/0123133 A1* | 6/2006 | Hrastar ............... H04L 63/1408 709/238 |
| 2006/0267744 A1 | 11/2006 | Baumgartner et al. |
| 2007/0049323 A1 | 3/2007 | Wang et al. |
| 2007/0079376 A1 | 4/2007 | Robert et al. |
| 2007/0200688 A1 | 8/2007 | Tang et al. |
| 2007/0298720 A1* | 12/2007 | Wolman ............... H04L 63/1408 455/66.1 |
| 2008/0186932 A1 | 8/2008 | Do et al. |
| 2009/0005052 A1* | 1/2009 | Abusch-Magder ... H04W 24/02 455/446 |
| 2009/0235077 A1 | 9/2009 | Cam Winget et al. |

FOREIGN PATENT DOCUMENTS

| | | |
|---|---|---|
| DE | 102004048668 A1 | 4/2006 |
| EP | 0167442 A2 | 1/1986 |
| EP | 1362753 A1 | 11/2003 |
| EP | 1514444 A1 | 3/2005 |
| EP | 1593564 A1 | 11/2005 |
| EP | 1809057 A1 | 7/2007 |
| EP | 2003818 A1 | 12/2008 |
| EP | 2124428 A1 | 11/2009 |
| GB | 2296843 A | 7/1996 |
| GB | 2317418 A | 3/1998 |
| GB | 2407455 A | 4/2005 |
| GB | 2435987 A | 9/2007 |
| GB | 2445046 A | 6/2008 |
| GB | 2457102 A | 8/2009 |
| WO | 95/33214 A1 | 12/1955 |
| WO | 96/04155 A1 | 2/1996 |
| WO | 00/21053 A1 | 4/2000 |
| WO | 01/32481 A1 | 5/2001 |
| WO | WO01/31797 A1 | 5/2001 |
| WO | 03/103322 A1 | 12/2003 |
| WO | 2005/112321 A1 | 11/2005 |
| WO | 2006/092737 A2 | 9/2006 |
| WO | 2006092737 A2 | 9/2006 |
| WO | 2007/019814 A1 | 2/2007 |
| WO | 2008/111001 A2 | 9/2008 |

OTHER PUBLICATIONS

International Search Report and Written Opinion dated Jun. 28, 2011, from corresponding International Patent Application No. PCT/US2010/060795.

International Search Report and Written Opinion dated Mar. 1, 2011, from corresponding International Patent Application No. PCT/US2010/060527.

International Search Report and Written Opinion dated May 13, 2011, from corresponding International Patent Application No. PCT/US2010/060675.

International Search Report and Written Opinion dated Feb. 28, 2011, from corresponding International Patent Application No. PCT/US2010/060532.

International Search Report and Written Opinion dated Mar. 1, 2011, from corresponding International Patent Application No. PCT/US2010/060750.

International Search Report and Written Opinion dated Mar. 10, 2011, from corresponding International Patent Application No. PCT/US2010/060811.

International Search Report and Written Opinion dated Apr. 12, 2011, from corresponding International Patent Application No. PCT/US2010/060760.

M. Mouly; M-B Pautet, "Mobility and Security Management" GSM System for Mobile Communications, Jan. 1, 1993, pp. 432-498, Europe Media, Lassay-Les-Chateaux, France.

International Search Report and Written Opinion dated Apr. 15, 2011, from corresponding International Patent Application No. PCT/US2010/060773.

International Search Report and Written Opinion dated Mar. 28, 2011, from corresponding International Patent Application No. PCT/US2010/060803.

International Search Report and Written Opinion dated Jun. 1, 2011, from corresponding International Patent Application No. PCT/US2010/060723.

International Search Report and Written Opinion dated May 24, 2011, from corresponding International Patent Application No. PCT/US2010/060518.

\* cited by examiner

| Channel Number | RxLevel |
|---|---|
| 975 | 24 |
| 1 | 12 |
| 10 | 12 |
| 24 | 12 |
| 32 | 19 |
| 56 | 21 |

APPARATUS AND METHOD FOR DETECTING A CLONED BASE STATION

CROSS REFERENCES TO RELATED APPLICATIONS

"Apparatus and Method of Detecting Jamming of Communications" having application number 12/643,049, issued as U.S. Pat. No. 8,319,615, on Nov. 27, 2012, to Snider et al.

"Apparatus and Method for Broadcasting the Detection of RF Jammer Presence" having application number 12/643,825, issued as U.S. Pat. No. 8,320,872, on Nov. 27, 2012, to Snider.

"Apparatus and Method for Compromised Vehicle Tracking" application number 12/643,498, issued as U.S. Pat. No. 8,896,431, on Nov. 25, 2014, to Snoder et al.

"Apparatus and Method for detecting Communication Interference" having application number 12/643,068, issued as U.S. Pat. No. 8,611,847, on Dec. 17, 2013, to Snider et al.

"Apparatus and Method for Detecting a Cloned Base Station" having application number 12/643,353, issued as U.S. Pat. No. 8,639,209, on Jan. 28, 2014, to Walby et al.

"Apparatus and Method for Determining an Invalid Base Station" having application number 12/643,463, by Dabholkar et al., published on Jun. 23, 2011, with Publication No. 2011/0151834.

"Apparatus and Method for Determining Vehicle Location" having application number 12/643,412, issued as U.S. Pat. No. 8,884,821, on the Nov. 11, 2014, to DeCabooter et al.

"Apparatus and Method for Maintaining Communication with a Stolen Vehicle Tracking Device" having application number 12/643,841 issued on Apr. 17, 2012, as U.S. Pat. No. 8,159,336 to Snider et al.

"Apparatus and Method for Reducing False Alarms in Stolen Vehicle Tracking" having application number 12/643,889, issued on Aug. 11, 2015, as U.S. Pat. No. 9,102,293, to Dabholkar et al.

"Apparatus and Method for Tracking Stolen Vehicles" having application number 12/643,862, by D'Avello, published Jun. 23, 2011, with Publication No. 2011/0148713.

"Apparatus and Method for Maintaining Communications with a Vehicle in the Presence of Jamming" having application number 12/643,850, issued on May 8, 2012, as U.S. Pat. No. 8,175,573, to D'Avello et al.

all of which are being filed on the same date as the present application and all of which having their contents incorporated herein by reference in their entireties.

FIELD OF THE INVENTION

The field of the invention relates to communications and more specifically to detecting the presence of cloned base stations.

BACKGROUND

Vehicles are equipped with various types of communication systems that provide or facilitate various types of functions. For instance, a vehicle may be equipped with a Global Positioning Satellite (GPS) location determination system that communicates with a GPS satellite and provides the ability to locate and track the vehicle. Vehicle security systems are also widely used in vehicles today. For example, a security system may communicate with an outside entity and when an attempt is made to break into a vehicle, the security system may attempt to warn a private security center (or some other appropriate entity such as the police) that a break-in is occurring. Some jurisdictions require the use of vehicle security systems because of the high number of vehicle break-ins or thefts in these areas.

Stolen vehicle tracking (SVT) applications also exist where a vehicle is provided with components that can detect if a vehicle is stolen and/or assist in the tracking of the stolen vehicle. Many SVT approaches rely upon GPS technology to pinpoint the location of the vehicle and a Global System for Mobile communications (GSM) cellular network to report the incident to a service provider via Short Messaging Service (SMS) or General Packet Radio Service (GPRS) data connection. Other examples of connections and protocols can be used.

Potential vehicle thieves have sometimes attempted to jam the receiver hardware at the vehicle by using a device that creates a strong wide-band signal in the receive band to block the GPS satellite and GSM network signals to the vehicles. In so doing, the theft of the vehicle could not be detected or reported.

In other examples, thieves or other criminals attempted to clone base stations. That is, the services of a base station are imitated by devices provided by the criminal and once a user (or the user's device) establishes communication with the cloned base station, the user or device incorrectly believed that the cloned base station was a valid base station. Thus, among other problems, the vehicle's security system were often fooled into sending warning messages to an invalid base station, no action was taken by the cloned base station (since it was provided by the criminal), and the vehicle was stolen without detection. Previous attempts at detecting jamming, detecting the presence of cloned base stations, and reporting these occurrences to a security center have generally been unsuccessful, slow, and/or expensive to accomplish.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a cloned base station is detected and its detection is reported to a user so that appropriate action can be taken. The approaches described herein are accurate in determining whether the suspect base station is actually a cloned station, and timely in that they allow for the detection of a cloned base station before a vehicle and/or its contents can be stolen. The approaches described herein can easily be retrofitted into existing systems thereby avoiding the need for costly re-wiring or re-working of existing systems.

In many of these embodiments, communications are established between a base station and a mobile unit. The mobile unit analyzes the content of at least some information received from the base station relating to neighboring cells. When the analyzing indicates that the base station is a cloned base station, a warning is initiated to the user.

In some aspects, an allocation table is stored in a memory storage device and the allocation table includes information related to the operating environment (e.g., signal strength levels of communication channels) of a user. The content of the allocation table is analyzed and a determination is made as to when the base station is a cloned base station based upon the analysis.

In other aspects, a Neighbor Cell List (or other information) is received and the analysis includes measuring the power level of at least one neighbor channel identified in the Neighbor Cell List and determining whether the base station is a cloned base station based upon the analysis. A warning can be initiated when the power level of the at least one neighbor channel is substantially zero. Alternatively, the power level of the current serving cell may be determined and a warning only initiated when the power level of the current serving cell is above a predetermined level and the power level of the at least one neighbor channel is substantially zero.

In still other aspects, a Neighbor Cell List is expected to be received at the mobile unit. A determination is made as to whether a Neighbor Cell List has been received and a warning is initiated when the Neighbor Cell List has not been received by the mobile unit.

In others of these embodiments, communications are established and engaged in with a base station. The communications may be established between an apparatus and a base station and, in some examples, the apparatus is disposed in or at a vehicle. However, it will be appreciated that the apparatus need not be at or in a vehicle, but could be at other locations as well. And, it will be appreciated that although the approaches described herein are described as generally related to and providing vehicular security, they can also be deployed in other environments and for other purposes as well.

An allocation table is stored in a memory storage device at the apparatus and the allocation table includes information related to the operating environment of a user or the apparatus. For example, the allocation table (or other data structures stored at the memory storage device) may identify channels, appropriate or desired signal strength levels for these channels, and whether these channels are in use. Predetermined or pre-assigned channels may be used in communications with the base station while other channels may be not assigned or forbidden for use. The content of the allocation table is analyzed and a determination is made as to when the base station is a cloned base station based upon the analysis.

When the analysis indicates that the base station is a cloned base station, a warning is presented to the user. As used herein, the expression "user" will be understood to be an end user of the protected vehicle, or a party authorized or charged to protect the vehicle (such as an off-site alarm center), and so forth.

In some of these examples, the determination that the base station is a cloned base station is based upon a heightened signal strength level associated with a channel or channels stored in the table (or other data structure). As used herein, "signal strength level" refers to a numeric value representing the strength of a received signal (e.g., in terms of received power). Specific examples of signal strength level included the Rx Level. As used herein, "heightened" means a level that exceeds a predetermined threshold. This threshold generally exceeds the signal strength value associated with ordinary use. In other examples, the determination of whether a clone exists is based upon analyzing the base station allocation (BA) table for the identity of channel(s) in use and if a channel(s) is being used but has not been assigned for use, it is assumed that a cloned base station is using the channel. In another example, the determination of whether the base station is a cloned base station is based upon determining whether a neighboring cell exists in the allocation table and when no neighboring cell exists it is assumed the base station is a cloned base station.

As used herein "operating environment" refers to the identity and properties of the communication channels used to communication between the apparatus and the base station and/or the identity and properties of the particular cell where the apparatus/user currently resides, the home cell of the apparatus or user, other neighboring cells, and so forth. In this regard, the operating environment may include the identity of at least one neighboring cell and the determination as to whether cloning exists may include determining when at least one signal strength value (e.g., a Rx Level value) associated with the at least one neighboring cell is a suspect value. In some of these examples, the apparatus measures signal strength levels on the channels on the Neighbor Cell List and these sensed levels are used to populate the table. Alternatively, the apparatus may omit use of the table and directly measure signal strength levels on channels identified in a received Neighbor Cell List.

The determination of whether the at least one signal strength value is a suspect value may include determining that the at least one signal strength value increases at a rate greater than a predetermined threshold rate. In other examples, the suspect value may be zero or approximately zero, indicating a low received signal strength, near the sensitivity level of the receiver. Other examples of suspect values that identify a cloned base station are possible.

In others of these examples, the base station is a valid base station and communications are established with a cloned base station subsequent to establishing communications with the valid base station. In still other examples, communications are established with a cloned base station before communications are established with a valid base station.

In others of these embodiments, the presence of a cloned base station is detected. At a vehicle, communications are established with a base station and communications engaged with the base station from the vehicle. An allocation table is stored in a memory storage device at the vehicle and the allocation table includes information related to the operating environment of the vehicle. The content of the allocation table is analyzed for a presence of at least one neighboring cell and a determination is made as to when the base station is a cloned base station based upon the analysis. When the analyzing indicates that the base station is a cloned base station, a warning is initiated and presented to a user at the vehicle. In some of these examples, the determination of whether the base station is a cloned base station when no neighboring cell exists in the allocation table. Alternatively, the table can be omitted and determination made from information received from a base station (e.g., a Neighbor Cell List may identify channels and the device may directly measure the received signal strength levels of the channels without consulting the table). In still other examples, some or all of the allocation table may be downloaded from another location (e.g., a base station or other mobile unit).

In some examples, the operating environment represented in the table may include or identify at least one neighboring cell and the determination as to whether a cloned base station exists may include determining when at least one signal strength value associated with the at least one neighboring cell is a suspect value. The suspect value may be indicated when the at least one signal strength value increases at a rate greater than a predetermined threshold rate. In other examples, the suspect value may be zero or approximately zero.

In still others of these embodiments, an apparatus detects the presence of a cloned base station and the apparatus includes a communication interface, a memory, a warning indicator, and a controller. The communication interface is configured to establish and engage in communications with a base station. As used herein, a "base station" is any transmitting and receiving device capable of transmitting communications with an electronic device using any communication channel, frequency, or protocol. In one example, a base station is of the type typically deployed in cellular communication systems. However, it will be understood that any type of base station communicating at any frequency and/or any communication protocol as known to those skilled in the art may be used.

The memory is coupled to the communication interface and includes an allocation table. The allocation table includes information related to the operating environment of the user or apparatus. The memory can also store computer instructions that implement any of the approaches described herein.

The controller is coupled to the communication interface, the memory, and the warning indicator. The controller is configured to analyze the content of the allocation table and to determine when the base station is a cloned base station based upon the analysis. The controller is further configured to, when the analyzing indicates that the base station is a cloned base station, initiate or present a warning to the user via the warning indicator.

In some examples, the controller is configured to determine that the base station is a cloned base station when no neighboring cell exists in the allocation table. In other examples, the determination that the base station is a cloned base station is based upon a heightened signal strength level associated with a channel as indicated by the allocation table. In other examples, the determination that the base station is a cloned base station is based upon when there are neighbors in the allocation table but all of the power levels are zero and the serving cell power level is above a predetermined threshold. In still other examples, the determination as to whether a base station is a cloned base station is based upon determining whether a particular communication channel is in use and whether use of this channel is authorized. Other examples are possible.

The warning indicator may be a number of devices or use a variety of approaches. In one example, the warning indicator comprises an audio speaker. In another example, the warning indictor is a visual indicator (e.g., flashing headlights, light emitting diodes (LEDs), or the like).

Figure 1:
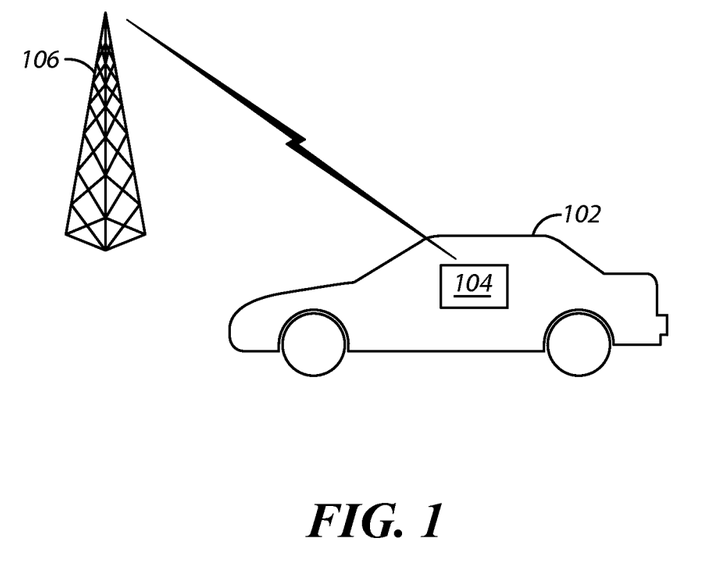
FIG. 1 comprises a block diagram of a system for detecting the presence of a cloned base station according to various embodiments of the present invention.

Referring now to FIG. 1, one example of a system for detecting a cloned base station that is in communication with or is attempting to establish communications with vehicles or systems present in vehicles is described. Although the examples described herein relate to vehicular communications or the tracking of vehicles, it will be appreciated that these approaches are not limited to devices deployed at or in vehicles and are specifically not limited to providing vehicular security. To the contrary, these approaches may be deployed at any location and provide security for any type of entity.

As shown in FIG. 1, a vehicle 102 includes a communication device 104. The communication device 104 communicates with a base station 106. The communication device 104 determines if the base station 106 is a cloned base station by analyzing an allocation table stored at the communication device 104. In this respect, the communication device 104 may be implemented by any combination of hardware and programmed software to implement this or other functions. The communication device 104 communicates with entities outside the vehicle 102 using any type of communication technology or protocol.

Besides the detection of cloned base stations, the communication device 104 may perform other functions and/or be incorporated into an existing device. In this respect, the communication device 104 may be a cellular phone, transponder, radio, or some combination of these or other devices. In other examples, the communication device 104 is not part of an existing device, but is deployed as a stand-alone unit including a separate housing structure or enclosure (apart from other portable devices that may be present in the vehicle 102). In this case, the communication device 104 may be communicatively coupled to and communicate with other devices (e.g., cellular phones).

The vehicle 102 may be any type of vehicle such as a car, truck, bus, airplane, ship, to name a few examples that are used to transport one or more persons. However, as mentioned above, these approaches are not limited to in-vehicle environments and applications and may be used in other environments such as homes and businesses to name two examples.

The base station 106 is any type of base station as known to those skilled in the art. In this respect it may be a cellular base station such as Model KRC 131 1002/2 R5F manufactured by Ericsson. Other examples of base stations are possible. In others of these examples, the base station 106 is a valid base station and communications are established (or are attempted to be established) with a cloned base station subsequent to establishing communications with the valid base station.

In one example of the operation of the system of FIG. 1, communications are established between the device 104 and the base station 106. An allocation table is stored in a memory storage device at the device 104 and the allocation table includes information related to the operating environment of a user of the vehicle 102 and/or the device 104. For example, the allocation table may identify neighboring cells, the home cell of the user, communication channels, signal strength levels of these channels (e.g., a Rx Level value), and whether these channels are in use or authorized for use to name a few examples. With regard to authorized channels, predetermined channels may be used in communications with the base station 106 while other channels are not to be used (i.e., not assigned). If the not-to-be used channels are in fact being used, then it may be assumed (in some examples) that a cloned base station is present and using these channels. In these examples, the device 104 measures signal strength levels on the channels on information received from a base station (e.g., a Neighbor Cell List) and these sensed levels are used to populate the table. Alternatively, the apparatus may omit use of the table and directly measure signal strength levels on channels identified in received information from a base station (e.g., a Neighbor Cell List).

Selected contents of the allocation table at the device 104 are analyzed and a determination is made by the device 104 as to when the base station 106 is a cloned base station based upon the analysis. The analysis may be a simple look-up of information contained in the table or may involve further processing (e.g., the use of equations, comparisons of values from the table, and so forth). When the analysis indicates that the base station 106 is a cloned base station, a warning is initiated and presented to the user. As used herein and as mentioned elsewhere herein, the expression "user" will be understood to an end user of the protected vehicle, or a party authorized or charged to protect the vehicle (such as an off-site alarm center), and so forth.

In some of these examples, the determination that the base station 106 is a cloned base station is based upon a heightened signal strength level on a channel or channels as indicated in the allocation table. As used herein, "heightened" means a level that exceeds a predetermined threshold. This threshold generally exceeds the signal strength value associated with ordinary use. For example, the unit may be sitting idle and monitoring the serving cell and neighbors which are all at a fairly consistent Rx Level. If one of the neighbor's Rx Level suddenly starts to rise, this could indicate the presence of a malicious base station that has been set up on this neighbor channel. The unit may attempt to perform a cell reselection to the malicious base station unless precautions are taken. In other examples, the determination of whether a cloned base station exists is based upon analyzing the base station allocation table for the identity of channel(s) in use and if the channel(s) in use are not assigned for communications (i.e., communications are occurring on a forbidden or unauthorized channel), it is assumed that a cloned base station exists and is using the channel. In another example, the determination of whether the base station 106 is a cloned base station is based upon determining whether a neighboring cell exists in the allocation table and when no neighboring cell exists assuming a cloned base station exists. In another example, the determination of whether the base station 106 is a cloned base station is based upon determining when there are neighbors in the allocation table but all the power levels are zero and the serving cell power level is above a predetermined threshold.

The determination of whether the at least one signal strength value is a suspect value may include determining that the signal strength value increases at a rate greater than a predetermined threshold rate. For example, the unit may be sitting idle and monitoring the serving cell and the neighbors which are all at a fairly consistent Rx Level. If one of the neighbor's Rx Level suddenly starts to rise greater than some value, e.g., 6 dB of its static value, this could trigger the indication of a malicious base station. In other examples, the suspect value may be an approximate zero value. Other examples of suspect values are possible.

In others of these examples, the base station 106 is a valid base station and communications are established with a cloned base station subsequent to establishing communications with the valid base station. In still other examples, communications are established with a cloned base station before communications are established with a valid base station.

In other examples, communications are established between the base station 106 and the device 104. The device 104 analyzes the content of at least some information received from the base station relating to neighboring cells. When the analyzing indicates that the base station 106 is a cloned base station, a warning is initiated to the user.

In some aspects, an allocation table is stored in a memory storage device at the device 104 and the allocation table includes information related to the operating environment of a user. The content of the allocation table is analyzed and a determination is made as to when the base station 104 is a cloned base station based upon the analysis. The allocation table may be constructed from information received in a Neighbor Cell List (that identifies channels) and from information that the device itself senses (e.g., signal strength information concerning the channels identified in the list).

In other aspects an allocation table is not consulted. For example, a Neighbor Cell List is received at the device 104 and the analysis includes determining a first power level of at least one channel included with the Neighbor Cell List and determining when the base station 106 is a cloned base station based upon the analysis. The determination may include having the device 104 sense the power levels identified in the Neighbor Cell List. A warning when the first power level of the at least one channel is substantially zero. Alternatively, a second power level of the current serving cell may be determined and a warning initiated when the second power level of the current serving cell of the device 104 is above a predetermined level and the first power level of the at least one channel is substantially zero.

In still other aspects, a Neighbor Cell List is expected to be received at the device 104. A determination is made as to whether a Neighbor Cell List has been received and a warning is initiated when the Neighbor Cell List has not been received at the device 104.

Various actions can be taken once jamming or the detection of a rogue base station occurs. As mentioned, a warning message can be transmitted to an emergency reporting center 108. The emergency reporting center 108 (e.g., the police or a private security provider) is coupled to the base station 106. For example, this warning message may be transmitted over a GSM network. In other examples, other frequencies and/or other types of networks in addition to or instead of the GSM network can be used to transmit the warning message (and/or transmit or receive other communications). For example, warning messages may be transmitted at FM Radio Data System (RDS) frequencies, over Wireless Local Area networks such as Wi-Fi networks, over infrared (IR) networks, Bluetooth (BT) networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/IDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be activated once jamming is detected. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a schema validation tool (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming or the presence of a rogue base station are detected various actions can be taken that affect the operation of the vehicle and/or a driver's ability to successfully drive the vehicle 102. In these examples, it is assumed that the detection of jamming denotes an attempt by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In some examples, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels jamming is determined to be occurring. The threshold can be based upon map data provided by a system or device that is disposed external to the communication device 104 and/or developed by the device 104 from previous readings (e.g., previous drives) to name two approaches. The thresholds can be loaded into the device 104.

In other aspects, the location of the vehicle 102 can be tracked even as jamming is occurring. For instance, Rx Level and/or Rx Qual readings (e.g., reported by one or more communication devices to an external service center) may be used to identify and/or confirm jammer presence and pinpoint location of the vehicle 102, for example, using triangulation approaches.

In some aspects, the communication device may authenticate the base station 106. For example, various handshaking approaches may be used by the communication device to authenticate the base station 106.

Figure 2:
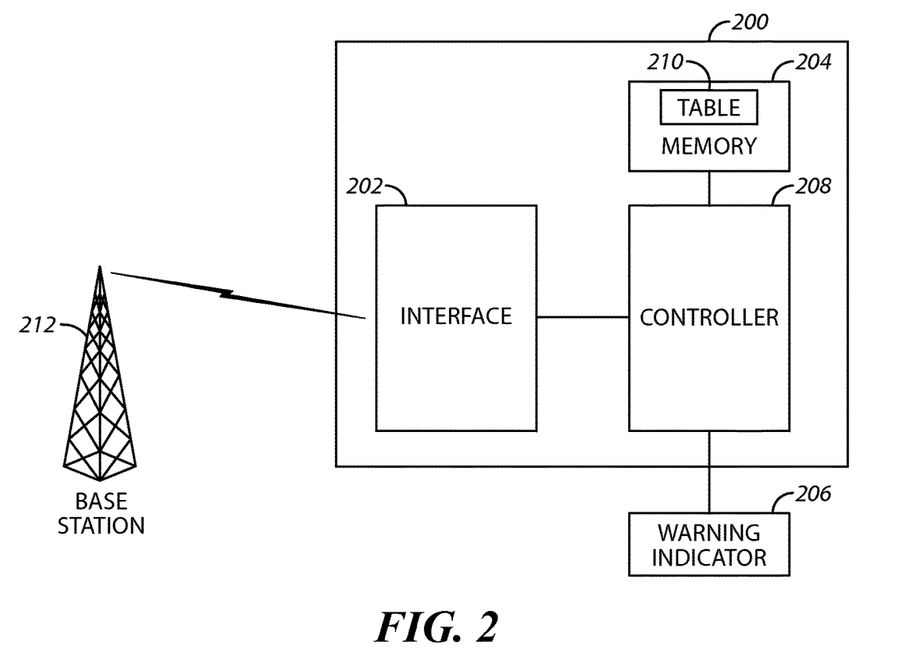
FIG. 2 comprises a block diagram of an apparatus for detecting the presence of a cloned base station according to various embodiments of the present invention.

Referring now to FIG. 2, an apparatus 200 that detects the presence of a cloned base station is described and includes a communication interface 202, a memory 204, a warning indicator 206, and a controller 208. The communication interface 202 is configured to establish and engage in communications with a base station 212 and may include any combination of electronic hardware and programmed software.

The memory 204 is coupled to the communication interface 202 and includes an allocation table 210. The allocation table 210 includes information related to the operating environment of a user. Various types of information may be included in the table. In one example, the allocation table includes the identity of at least one neighboring cell. The table may also include identities of communication channels used, the identity of the home cell of the device, channels assigned for communication to the base stations, channels not assigned for communication to the base stations, signal strength levels (e.g., maximum or minimum values allowed), and so forth. Other types of information may also be included or be associated with the allocation table and stored either with the allocation table or elsewhere in memory. The memory 204 may also store computer instructions that implement any of the approaches described herein.

The controller 208 is coupled to the communication interface 202, the memory 204, and the warning indicator 206. The controller 208 is configured or programmed to analyze the content of the allocation table and to determine when the base station 212 is a cloned base station based upon the analysis. The analysis may include comparing values in the table to thresholds, to name one example.

The controller 208 is further configured to, when the analyzing indicates that the base station 212 is a cloned base station, a warning is initiated and presented to the user via the warning indicator 206. The warning indicator 206 may be a number of devices or use a variety of approaches. In one example, the warning indicator 206 comprises an audio speaker. In another example, the warning indictor 206 is a visual indicator (e.g., headlights, LEDs, or the like). Other examples and combinations are possible. The controller 208 may also communicate (via the interface 202) with other entities such as the police or private security centers to name two examples and provide warnings to these entities.

The controller 208 may determine that cloning exists in a variety of different ways. For example, the controller 208 may determine when at least one signal strength value associated with the at least one neighboring cell is a suspect value. When this event occurs, a warning may be sent to the user that a cloned base station has been detected. The determination of whether the at least one signal strength value is a suspect value may include determining that the at least one signal strength value increases at a rate greater than a predetermined threshold rate. For example, if the signal strength measured on all of the channels for the neighbor cells is the same (or substantially the same), this made indicate that jamming is occurring. In other examples, the suspect value may be an approximate zero value, indicating a low received signal strength, near the sensitivity level of the receiver. Other examples of suspect values are possible.

In some examples, the controller 208 is configured to determine that the base station 212 is a cloned base station when no neighboring cell exists in the allocation table. In other examples, the determination that the base station is a cloned base station is based upon a heightened signal strength level associated with a channel in the allocation table. In still other examples, the determination as to whether the base station 212 is a cloned base station is based upon determining whether a particular communication channel is in use.

In yet other examples, the allocation table 210 can be examined and if all received signal strength levels for all channel entries in the table are zero, a cloned base station may be determined. In still other examples, if the apparatus 200 is in motion and the signal strength levels of the serving cell does not change by a predetermined threshold or after driving a certain distance no cell reselections have been performed, a warning can be initiated. Other examples are possible.

In other aspects, a Neighbor Cell List is received by the controller 208 and the controller determines whether a first power level of at least one channel on the list is suspect (e.g., substantially zero). A warning when the first power level of the at least one channel is suspect. Alternatively, a second power level of the current serving cell may be determined and a warning only initiated when the second power level of the current serving cell is above a predetermined level and the first power level of the at least one channel is substantially zero.

In still other aspects, a Neighbor Cell List is expected to be received by the controller 208. A determination is made as to whether a Neighbor Cell List has been received by the controller 208 and a warning is initiated when the Neighbor Cell List has not been received by the controller 208.

Figure 3:
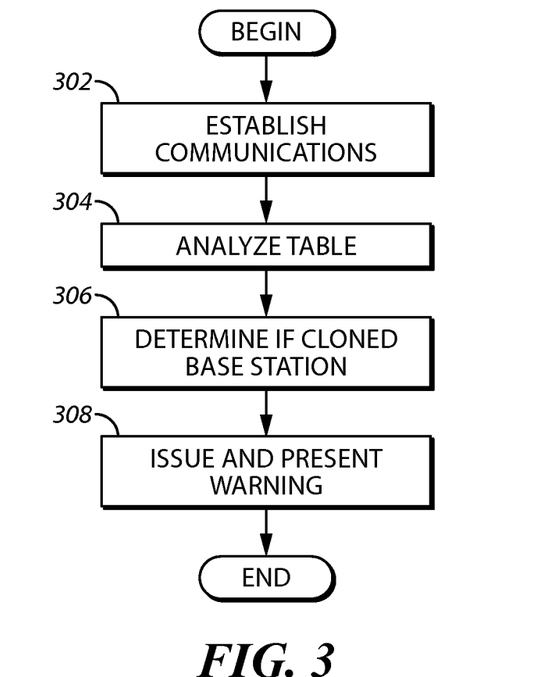
FIG. 3 comprises a flow chart of an approach for detecting the presence of a cloned base station according to various embodiments of the present invention.

Referring now to FIG. 3, one example of an approach for detecting the existence of a cloned base station is described. At a vehicle, at step 302 communications are established with a base station and communications engaged with the base station from the vehicle. For example, a registered mobile may establish service with a base station according to techniques that are well known to those skilled in the art. An allocation table is stored in a memory storage device at the vehicle and the allocation table includes information related to the operating environment of the vehicle. For example, the operating environment may include at least one neighboring cell. A Neighbor Cell List including a list of the channels of the base stations in the cells nearby this cell, may be received from the base station. Other examples of information may also be stored in the allocation table. The table may be stored in any type of data structure such as a table, linked list, and so forth.

At step 304, some or all of the content of the allocation table is analyzed. This step may be performed by a simple look-up of information from the table in some examples. However, in other examples, information may be obtained from the table and further processed. In this regard and to take one example, information from the table may be obtained (e.g., a signal strength indicator value) and compared to a predetermined threshold (e.g., a maximum threshold) stored at the table or elsewhere in memory.

At step 306, a determination of whether the base station is a cloned base station is made based upon the analysis. In some examples, the controller is configured or programmed to determine that the base station is a cloned base station when no neighboring cell exists in the allocation table. This determination could be made by the unit when it receives an empty Neighbor Cell List from the base station. This determination could also be made if the Neighbor Cell List is missing from the broadcast control channel sent from the base station. In other examples, the determination that the base station is a cloned base station is based upon a heightened signal strength level associated with a channel in the allocation table. In still other examples, the determination as to whether a base station is a cloned base station is based upon determining whether a particular communication channel is in use. Other examples are possible.

At step 308, when the analyzing indicates that the base station is a cloned base station, a warning is initiated and presented to a user at the vehicle. As mentioned, the warning indicator may be or include an audio speaker. In another example, the warning indictor may be a visual indicator (e.g., lights, LEDs, or the like). Other examples and combinations of warning indicators are possible. The apparatus may also communicate with other entities such as the police or private security centers to name two examples and provide warnings to these entities.

Figure 4:
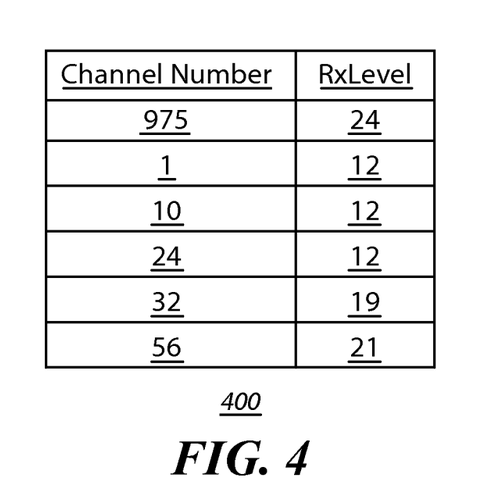
FIG. 4 comprises one example of a base station allocation table according to various embodiments of the present invention.

Referring now to FIG. 4, one example of an allocation table 400 is described. The allocation table 400 is a base allocation (BA) table that is a list of channels of all serving cells in the immediate area of a mobile unit at the vehicle. For example, the first entry is the serving cell and in this case the unit has service on channel 975. The base station corresponding to channel 975 has informed the unit that there are base stations in the immediate area on channels 1, 10, 24, 32, and 56. In normal operation, it is the unit's responsibility to measure the signal strengths on these neighbors and report the strongest values (e.g., the strongest six values) to the base station. It is the decision of the base station as to whether or not to hand over the unit to one of these other cells to be initiated. For example, the table of FIG. 4 shows signal strength measurements as they might occur before the cloned base station is activated. If a criminal attempts to set up a clone on channel 24, the Rx Level of this cell will likely appear to increase from 12 to some much higher value while the vehicle is not moving. If this value increases over a certain threshold such as 12 dB, then a clone has been detected.

Figure 5:
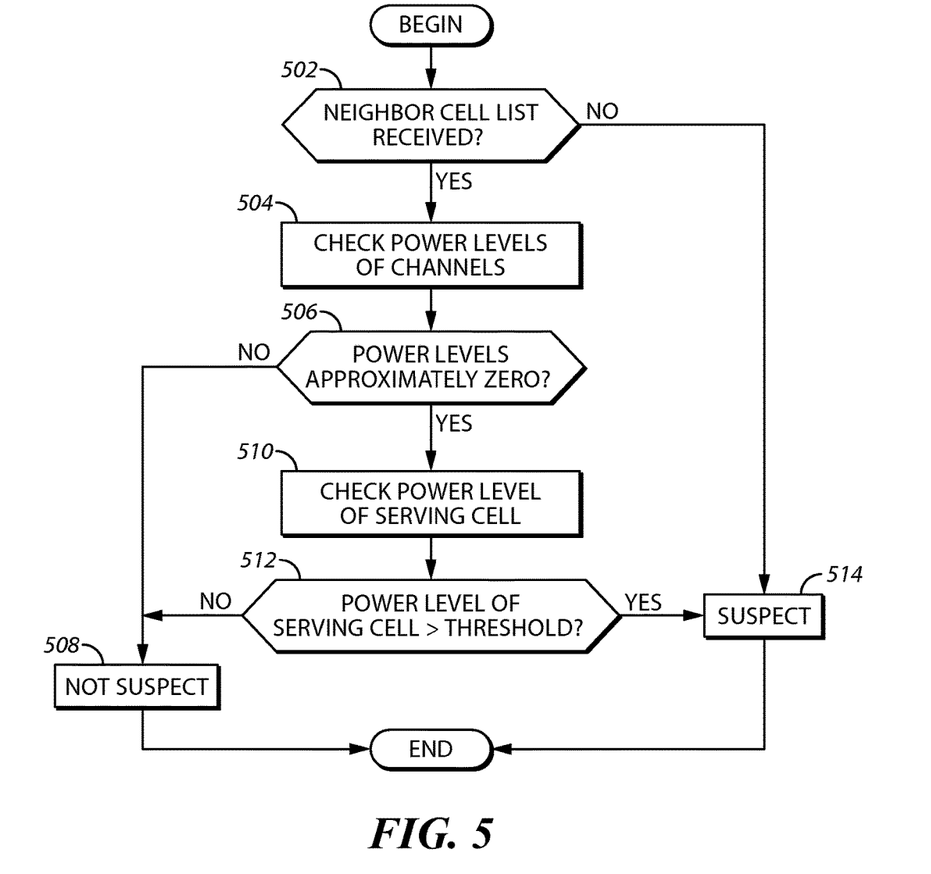
FIG. 5 comprises a flow chart of an approach for detecting the presence of a cloned base station according to various embodiments of the present invention.

Referring now to FIG. 5, another example of an approach for determining the existence of a cloned base station is described. At step 502, it is determined whether a Neighbor Cell List (or other information) has been received at the mobile unit (e.g., the device 104 of FIG. 1). If the answer is negative, then execution continues at step 514 where the determination is made that the base station is suspect and a warning initiated.

If the answer at step 502 is affirmative, at step 504 the power levels of each of the channels listed in the Neighbor Cell List are sensed by the mobile unit. At step 506, it is determined whether all (or a predetermined number of these levels) are zero. If the answer is negative, control continues at step 508 where the base station is determined not to be suspect and no warning is initiated.

If the answer at step 506, is affirmative, then at step 510 the power level of the serving cell of the mobile unit is sensed. At step 512, it is determined if this value is above a sensed threshold. If the answer is negative, execution continues at step 508 as described above. If the answer is affirmative, then execution continues at step 514 as described above. It will be appreciated that steps 510 and 512 can be omitted and that a base station may be viewed as suspect if the power on all (or a predetermined number) of the channels in the Neighbor Cell List is zero or substantially zero.

It will be appreciated that the approaches of FIG. 5 do not use an allocation table. More specifically, no allocation table is used and the analysis described is performed on-the-fly as the information is received at the mobile unit. On the other hand, the information received in the Neighbor Cell List may be used to populate an allocation table and the sensed reading of the channels (by the mobile unit) may also be used to populate the table. In this later approach, the approaches described herein may be used to access the information in the table and to make a determination as to whether a candidate base station is a cloned base station.

Thus, approaches are provided where a cloned base station is detected and its detection is reported to an appropriate entity or authority so that action can be taken. The approaches described herein are accurate in determining whether the base station is actually a cloned station, and timely in that they allow for the detection of a cloned base station before a vehicle and/or its contents can be stolen. The approaches described herein can easily be retrofitted into existing systems thereby avoiding the need for costly re-wiring or re-working of the system.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method, performed by a wireless mobile communications device, of detecting the presence of a cloned base station, the method comprising:
   determining whether a Neighbor Cell List, which lists channels of base stations of neighboring cells, has been received from the current serving cell at the wireless mobile communication device;
   when it is determined that the Neighbor Cell List has not been received from the current serving cell at the wireless mobile communication device, sending from the wireless mobile communication device a warning to a user of the wireless mobile communications device that the base station for the current serving cell is a base-station clone;
   when it is determined that the Neighbor Cell List has been received from the current serving cell at the wireless mobile communication device, sensing, by the wireless mobile communication device, respective power levels of each of the channels listed in the Neighbor Cell List;
   determining whether at least a predetermined number of neighboring cells listed in the Neighbor Cell List have a power level of zero;
   when it is determined that (1) the Neighbor Cell List has been received from the current serving cell at the wireless mobile communication device, and (2) at least the predetermined number of neighboring cells listed in the Neighbor Cell List have a power level of zero, sensing, by the wireless mobile communication device, a power level of the current serving cell;
   determining whether the power level of the current serving cell is greater than a current-serving-cell threshold power level; and
   when it is determined that (1) the Neighbor Cell List has been received from the current serving cell at the wireless mobile communication device, (2) at least the predetermined number of neighboring cells listed in the Neighbor Cell List have a power level of zero, and (3) the power level of the current serving cell is greater than a current-serving-cell threshold power level, sending from the wireless mobile communication device a warning to a user of the wireless mobile communication device that the base station for the current serving cell is a base-station clone.

2. The method of claim 1, wherein:
sensing, by the wireless mobile communication device, respective power levels of each of the channels listed in the Neighbor Cell List further comprises sensing whether a power level of any of the channels listed in the Neighbor Cell List increases by more than a neighbor-cell-increase threshold; and
when it is determined that the power level of any of the channels listed in the Neighbor Cell List has increased by more than the neighbor-cell-increase threshold, sending from the wireless mobile communication device a warning to a user of the wireless mobile communication device that the base station for the current serving cell is a base-station clone.

3. The method of claim 1, wherein:
sensing, by the wireless mobile communication device, respective power levels of each of the channels listed in the Neighbor Cell List further comprises sensing whether a power level of any of the channels listed in the Neighbor Cell List increases at a rate greater than a neighbor-cell-increase threshold rate; and
when it is determined that the power level of any of the channels listed in the Neighbor Cell List has increased at a rate greater than a neighbor-cell-increase threshold rate, sending from the wireless mobile communication device a warning to a user of the wireless mobile communication device that the base station for the current serving cell is a base-station clone.

4. The method of claim 1, wherein:
sensing, by the wireless mobile communication device, respective power levels of each of the channels listed in the Neighbor Cell List further comprises sensing whether a power level of any of the channels listed in the Neighbor Cell List increases by more than a neighbor-cell-increase threshold;

when it is determined that the power level of any of the channels listed in the Neighbor Cell List has increased by more than the neighbor-cell-increase threshold, determining whether a vehicle in which the wireless mobile communication device is deployed has moved while the power level of any of the channels listed in the Neighbor Cell List increased by more than a neighbor-cell-increase threshold; and when it is determined that the vehicle in which the wireless mobile communication device is deployed has not moved while the power level of any of the channels listed in the Neighbor Cell List increased by more than a neighbor-cell-increase threshold, sending from the wireless mobile communication device a warning to a user of the wireless mobile communication device that the base station for the current serving cell is a base-station clone.

\* \* \* \* \*